United States Patent [19]
Felske et al.

[11] Patent Number: 5,144,459
[45] Date of Patent: Sep. 1, 1992

[54] WINDSHIELD REFLECTOR FOR IMAGING SIGNALS INTO VIEW OF DRIVER

[75] Inventors: Armin Felske, Wolfsburg; Bernd Stoffregen, Braunschweig; Manfred-Andreas Beeck, Gifhorn; Gerd Sauer, StolbergVenwegen; Michael Hassiepen; Detlev Rebenstorff, both of Aachen, all of Fed. Rep. of Germany

[73] Assignee: Saint-Gobain Vitrage, D'Alsace, France

[21] Appl. No.: 903,041

[22] Filed: Sep. 2, 1986

[30] Foreign Application Priority Data

Sep. 10, 1985 [DE] Fed. Rep. of Germany ....... 3532120

[51] Int. Cl.$^5$ .......................... G02B 5/32; G02B 27/10
[52] U.S. Cl. ...................................... 359/13; 359/630; 340/705
[58] Field of Search .................. 350/3.6, 3.65, 3.7, 350/3.72, 3.75, 3.77, 3.85, 3.86, 174; 340/705; 359/1, 8, 15, 19, 22, 24, 32, 33, 630, 631, 13, 14

[56] References Cited

U.S. PATENT DOCUMENTS

| | | | |
|---|---|---|---|
| 3,560,921 | 2/1971 | Lopez | 350/3.85 X |
| 3,695,744 | 10/1972 | Clay | 350/3.77 |
| 3,887,273 | 6/1975 | Griffiths | 350/174 X |
| 3,945,716 | 3/1976 | Kinder | 350/3.72 X |
| 4,309,070 | 1/1982 | Searle | 350/3.7 |
| 4,361,428 | 11/1982 | Bartusel et al. | 65/29 |
| 4,447,128 | 5/1984 | Ferrer | 350/174 |
| 4,536,833 | 8/1985 | Davis | 350/3.72 X |
| 4,613,200 | 9/1986 | Hartman | 350/3.7 |
| 4,647,142 | 3/1987 | Boot | 350/174 |

FOREIGN PATENT DOCUMENTS

| | | |
|---|---|---|
| 0104115 | 3/1984 | European Pat. Off. . |
| 0250311 | 12/1987 | European Pat. Off. . |
| 2450704B1 | 12/1975 | Fed. Rep. of Germany . |
| 3000402 | 7/1980 | Fed. Rep. of Germany . |
| 3223650 | 12/1983 | Fed. Rep. of Germany ..... 350/3.77 |
| 3523032 | 2/1986 | Fed. Rep. of Germany . |

OTHER PUBLICATIONS

Collier, R., et al, *Optical Holography*, New York: Academic Press, 1971 pp. 514–522.
Sincerbox, G. *IBM Tech. Disc. Bull.* 10(3), Aug. 1967, pp. 267–268.
(S04570087) Rao, S., et al, "Holographic Methods for the Fabrication of Various types of Mirrors," *Rev. Sci. Instrum.* 51(6), Jun., 1980, pp. 809–813.
Magarinos et al; "Holographic Mirrors"; *Optical Engineering;* vol. 24, No. 5; Sep./Oct. 1985; pp. 769–780.

*Primary Examiner*—Rodney B. Bovernick
*Assistant Examiner*—David R. Parsons
*Attorney, Agent, or Firm*—Pennie & Edmonds

[57] ABSTRACT

A windshield (1) for motor vehicles provided with a reflecting arrangement (6) for making optical information or signals visible to the driver of the vehicle; said information or signals being made recognizable in the same field of view as is suitable for the observation of traffic and the road ahead by said driver. According to the invention, the reflecting arrangement (6) is a hologram with the characteristic of a mirror. The angle of reflection α of the holographic mirror is different from the angle of reflection β of the surface of the glass upon which said hologram is mounted. As a result the rays R' reflected from the surface of the glass do not reach the eye (8) of the observer, whereas the rays R reflected from the holographic mirror do. In the case of a bent windshield, a hologram with the function of a flat mirror will be disposed on a carrier layer curved corresponding to the shape of the windshield so that even in the case of bent windshields, the reflected image of the optical signals or information is free of aberrations.

7 Claims, 3 Drawing Sheets

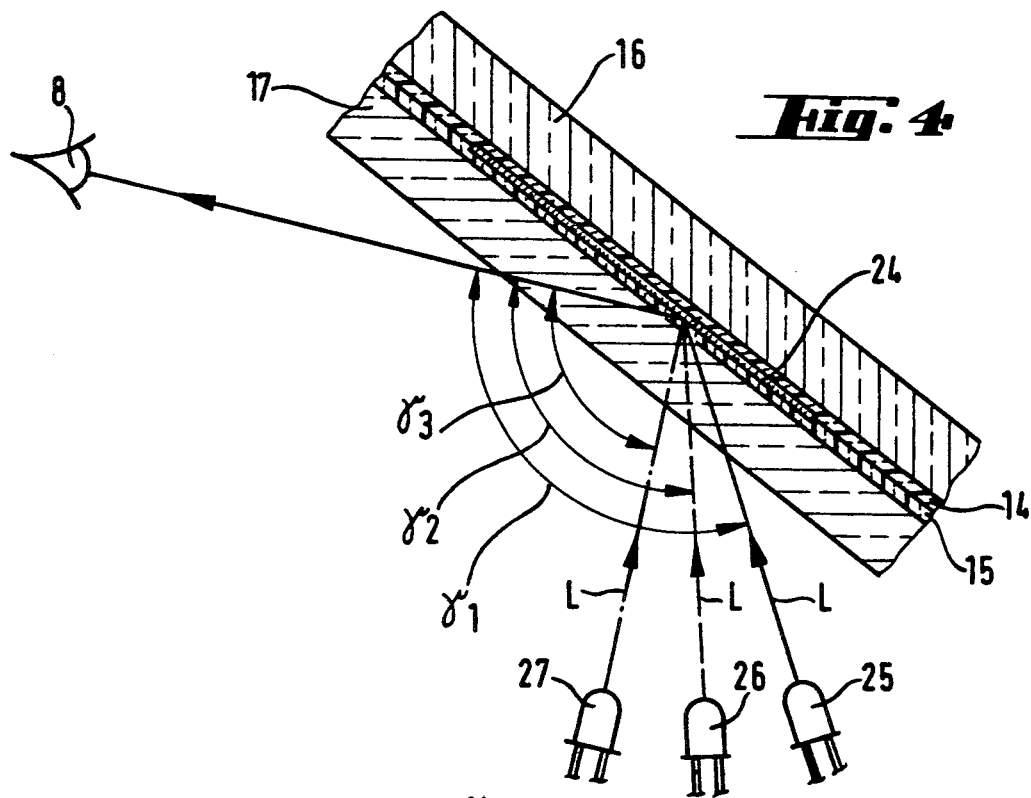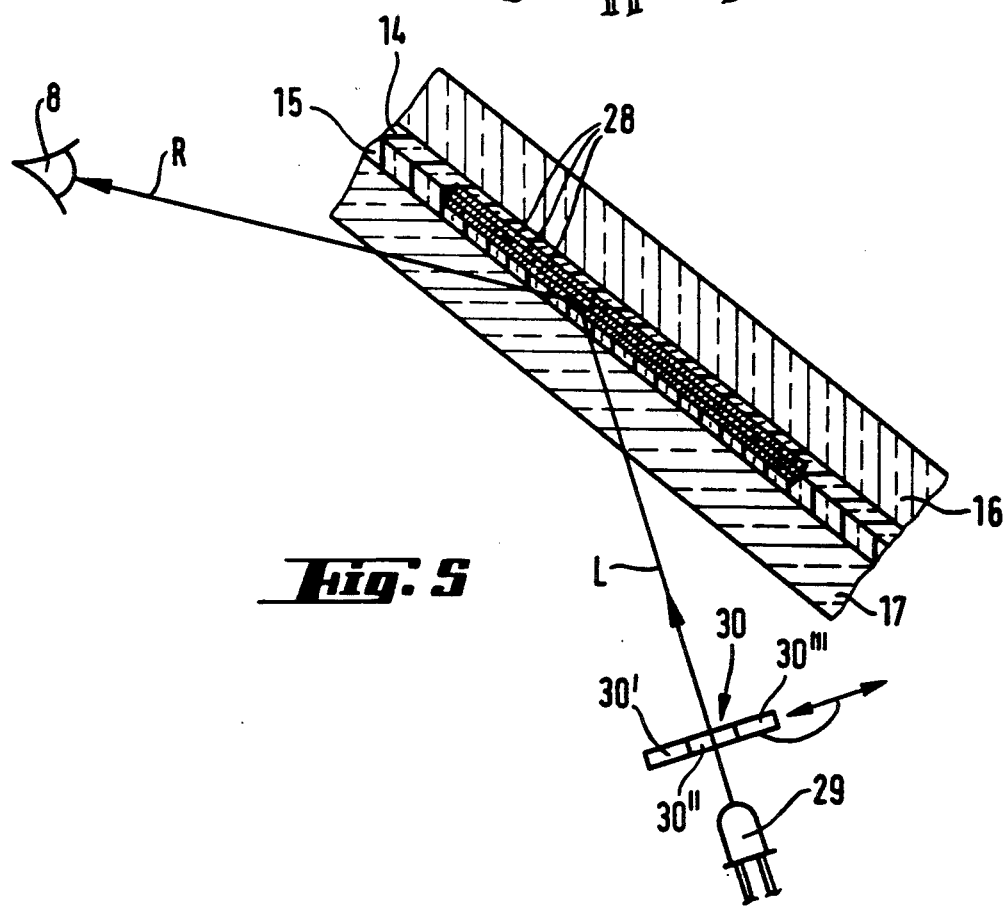

WINDSHIELD REFLECTOR FOR IMAGING SIGNALS INTO VIEW OF DRIVER

BACKGROUND OF THE INVENTION

The invention relates to a windshield for motor vehicles with a reflecting arrangement which allows optical information or signals to be reflected in the windshield and made visible in the driver's field of view, as a result of which the optical information is recognizable by the driver within the same field of view as is suitable for the observation of the traffic.

In the case of windshields of this type, important information and warning signals may be observed by the driver without there being any need for the driver to change his direction of vision from the traffic in front of him. The optical elements conveying the optical information and/or signals are disposed, as a rule, within the dashboard. In the case of a known windshield of this type, the reflecting arrangement is a partially reflective, thin metal layer which must allow sufficient transmission of light in order to ensure the required transparency of the windshield, even in the area of this layer.

The optical information or signals are not only reflected by the partially reflective layer as such, but also at the glass-air or glass-synthetic material layer interfaces These undesirable reflections lead to double images which disturb the observation of useful information, since the reflected primary light is relatively weak and even light striking the dashboard from the most diverse directions will be reflected and form a disturbing background against which the relatively weak useful signals show little contrast.

In order to eliminate these disturbing double images, it has been known to select the geometric arrangement in such a way that the angle of incidence of the light rays coming from the signal transmitters lies in the order of magnitude of the Brewster angle, and to dispose a polarization filter in the path of rays of the image to be observed which extinguishes the polarized light rays reflected at the surfaces of the glass (German Pat. No. 24 50 704). In the case of this known arrangement, the disturbing double images are eliminated. However, this known arrangement is still not without disadvantages. These include the fact that the predetermined angle of incidence calls for a certain geometric arrangement of the windshield and/or of the irradiation arrangement. These disadvantages also include the fact that the partially reflecting layer, especially in the case of direct illumination by the sun from the outside, acts as a strongly reflecting mirrored surface and may bring about the undesirable blinding of other motorists. Furthermore, the reflected image of the signals recognizable from inside of the vehicle depends, perforce, on the planimetrics of the reflecting surface. Since windshields as a rule are not flat but curved, it is unavoidable that the reflected image will be rendered correspondingly distorted. Any difficulty in viewing the image is then further compounded by the high transparency required of the partially reflecting layer, which allows only a relatively small portion of the light incident on this layer to be reflected. Therefore, depending upon the brightness of the surroundings, the signal reflected in the windshield may appear relatively weak.

SUMMARY OF THE INVENTION

The invention is a windshield of the type initially mentioned, with a reflecting arrangement within the driver's field of view in such a way that a stronger reflection of the useful signals will be achieved along with the simultaneous suppression of the reflection of interfering light.

According to the invention this task is solved through the use of a reflecting arrangement that is a hologram with the characteristic of a mirror. In accordance with the invention, a layer is disposed on or within the windshield which contains a volume hologram with the function of a flat mirror instead of a partially reflective coating. This layer containing the volume or reflection hologram may be disposed either between the two silicate glass layers of a laminated glass pane or on the inside surface of the windshield. In the latter case, it is covered by a suitable protective layer.

Preferably, the volume hologram is disposed on a carrier layer curved corresponding to the shape of the windshield. The hologram is formed so that one may obtain a reflected image of the desired signals and information without aberrations or distortion, even in the case of bent windshields.

According to another advantageous development of the invention, reflection holograms are formed and used in such a manner that the holographically rendered flat mirror surface has a different inclination than the windshield itself. In this manner it is possible, independent of the geometric conditions of the motor vehicle and the predetermined inclination of the windshield, to shape the reflection hologram in such a way that the reflecting surface will show its optimum inclination. Moreover, as a result of the fact that the reflection angle of the hologram is different from the reflection angle of the windshield, it will be possible to eliminate the double images which develop as a result of reflections on the glass surfaces of the windshield.

Reflection holograms may be produced with other desired characteristics so that their use for the purposes of the invention leads to a series of other advantages. For example, it is possible to produce reflection holograms which only reflect selected wavelengths. In this way one may achieve the reflection of up to 80% or more of the incident signals of suitable wavelength at the observation angle, while the hologram will exhibit a relatively high transparency for all remaining wavelengths. This would result in a decrease of interfering reflections, thus considerably improving the contrast of the reflected image of the desired optical information or signal.

Furthermore, it is possible to form the reflection hologram in such a way that the signals and optical information reflected into the field of vision of the driver are reproduced by the hologram such that their virtual image appears to be projected to a great distance in front of the vehicle. For the driver the image of the street lying in front of him then appears combined with the optical signals at an endless distance and in this manner the eye sees the happenings of the traffic, as well as the optical signals, sharply and simultaneously.

The reflection hologram is formed by creating an ordered grate structure in the volume of a suitable medium responsive to actinic radiation following known processes disclosed for example in R.J. Collier et al. *Optical Holography*, (Academic Press 1971); and *Topics in Applied Physics*, Vol.20 (Springer-Verlag 1977). A volume hologram of this kind, contrary to a surface hologram, has for each projected reflecting surface an optimum reflection angle with an optimum reflection color. The reflection angle as well as the reflection color may be controlled by the exposure as well as by the development process.

In the case of the arrangement of a reflection hologram in the windshield in accordance with the invention, the irradiation angle and the observation angle, as well as the wavelength, must be selected correctly. Only when all three conditions are fulfilled simultaneously will the signals or information become visible to the observer.

While in the case of the hitherto described form of the invention the reflection hologram is the projection of a plane mirror, and reflects a signal produced or disposed outside the windshield, according to another development of the invention the virtual image of a signal or symbol is recorded in the hologram itself. In this case, when the hologram is illuminated, preferably by monochromatic light, the recorded image is reconstructed from the hologram and the symbol becomes visible for the driver. In a further development of this embodiment, one can form reflection holograms in the windshield with different symbols each of which is reconstructed by a different wavelength of light or by a light beam incident on the hologram at a different angle. By illumination of these holograms with monochromatic light of various wavelengths (each matched with the hologram of one of the signals), or by illumination under different irradiation angles, one will be able to selectively make individual holograms of these signals visible. An arrangement of this type is suitable, for example, to make visible in the windshield certain warning signals or symbols relating to the traffic.

BRIEF DESCRIPTION OF THE DRAWING

These and other objects, features, characteristics and advantages of the invention will be more readily apparent from the subsequent description of a preferred embodiment of the invention in which:

FIG. 4 shows a cross-section of a windshield according to the invention with a multiple hologram containing various symbols in the case of which the individual symbols are made to flash by selectively changing the angle of illumination; and FIG. 5 shows a cross-section of a windshield according to the invention with a multiple hologram containing various symbols in the case of which the individual symbols are made to flash selectively though a shifting of the color of the illuminating rays.

DESCRIPTION OF PREFERRED EMBODIMENT

Figure 1:
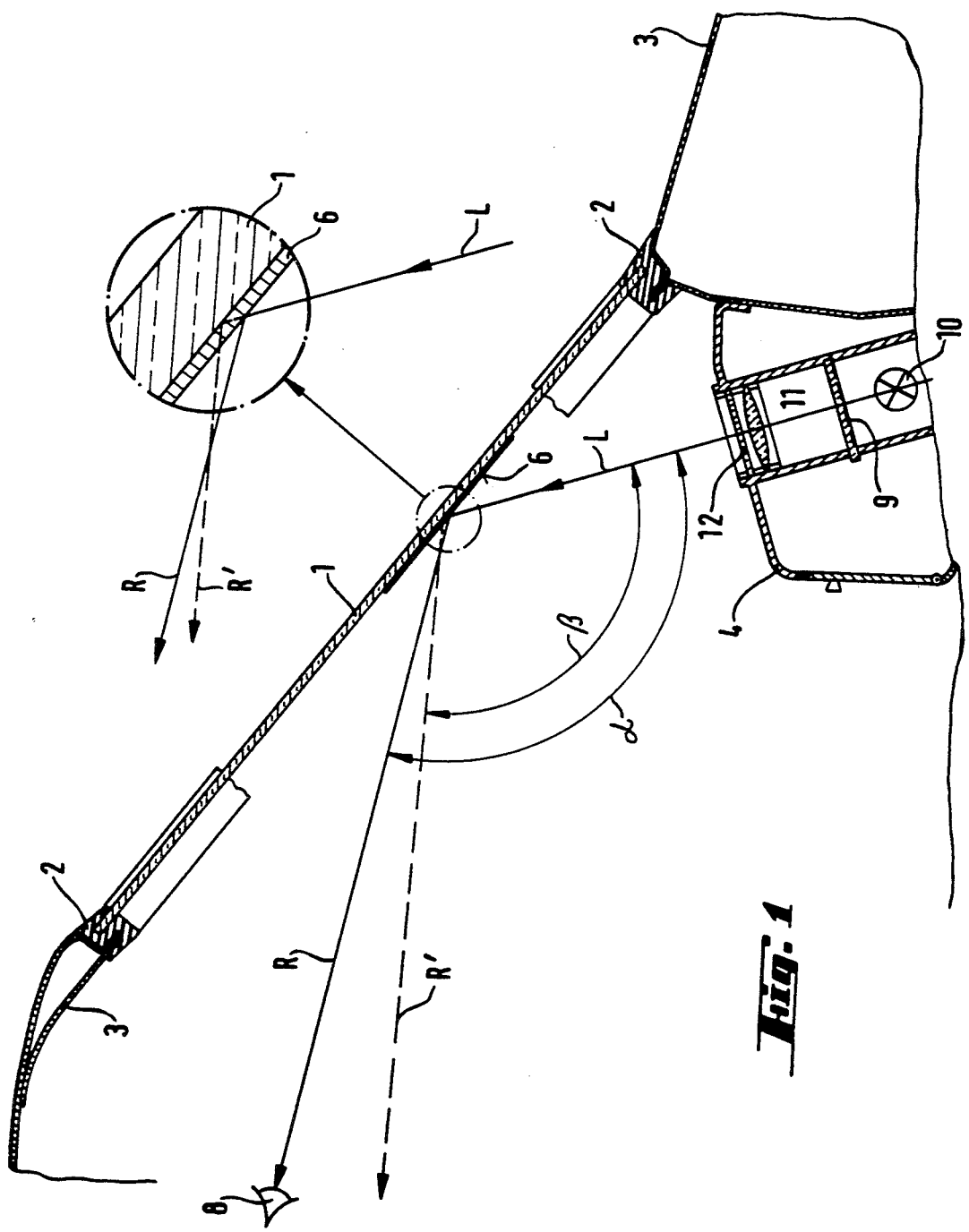
FIG. 1 shows a cross-section along a vertical cut of a windshield according to the invention.

As shown in FIG. 1, a windshield 1 is attached to a body 3 of a vehicle with the help of a surrounding rubber frame or gasket 2. A reflection hologram 6 is mounted on the windshield. The windshield has been illustrated as a monolithic glass pane, but it is understood that it may basically have any given construction and must have the required safety features. Below windshield 1 there is a dashboard 4 in which an optical signal producer is disposed in a manner such that the rays of light L emanating from the signal producer are reflected from reflection hologram 6 in such a way that the reflected light rays R are perceived by eyes 8 of the driver of the vehicle. The reflecting surface depicted in the reflection hologram 6 has a different inclination than windshield 1. Since the hologram's reflection angle $\alpha$ is different from the reflection angle $\beta$ of the windshield, the light rays R' of the signal reflected by the surfaces of the windshield do not reach the eyes 8 of the driver, so the latter does not perceive any interfering double images of the signal from the signal producer in the dashboard.

The optical information which is reflected into the field of vision of the driver may include all manner of variable signals and information. For example, warning signals can be used which light up in the case of certain situations. These warning signals may be formed by light-emitting diodes or by a transparent information carrier permeated by a light source, such as a diapositive. The optical information can be a display of changing values such as the speed of the vehicle, the distance of the vehicle from the vehicle travelling in front of it, or any kind of value concerning the operational condition of the vehicle. These may be indicated by means of a liquid crystal display or by means of a self-illuminating matrix.

In the example shown in FIG. 1, the warning signal that is to be reflected exists as a diapositive 9 which is penetrated by rays from a light source 10. In front of the diapositive 9, a large diameter lens 11 is mounted so that the diapositive 9 is located near the focal point of the lens 11. A transparent protective shield 12 covers the front of the lens 11. As a result of the magnifying effect of lens 11, the information on the diapositive is seen by the driver as a corresponding enlargement. Depending on the adjustment of the lens 11, the optical arrangement may be set in such a way that the signals are observed at a desired finite distance or else infinity. Instead of a trans-illuminated diapositive 9, self-illuminating displays or displays illuminated from above may also be used in the arrangement illustrated. Light-emitting diodes or liquid crystal displays, controlled by digital or analog means, may be employed.

While in the above described case, the reflection hologram 6 needs to have only the function of a simple mirror, the hologram 6 itself may also be formed in such a way that it performs the function of imaging the signal that is to be reflected so as to produce a sharp image at, for example, infinity. In such case, reproducing lens 11 is not required.

Figure 2:
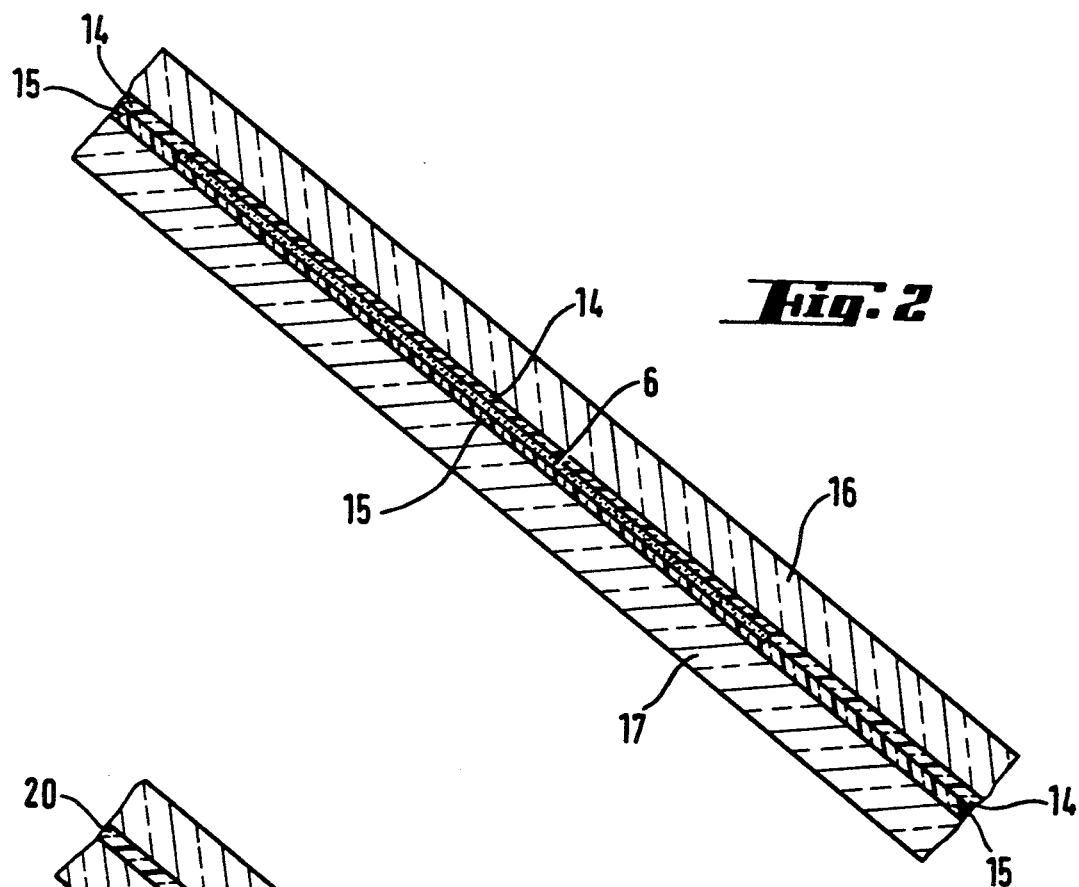
FIG. 2 shows a cross-section of a windshield according to the invention made of a laminated safety glass with a reflection hologram disposed between the two glass panes of the laminated glass pane.
Figure 3:
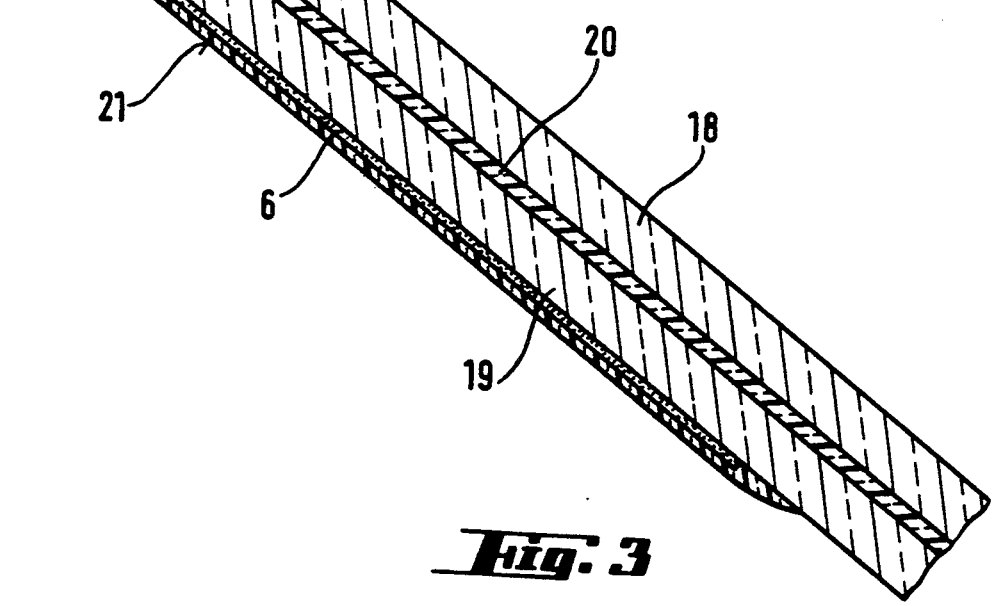
FIG. 3 shows a cross-section of a windshield according to the invention made of laminated safety glass with a reflection hologram disposed on the surface of the glass pane facing the passenger compartment.

As shown in FIG. 2, the layer containing the reflection hologram 6 is disposed between two thermoplastic, adhesive layers 14, 15 which connect two silicate glass panes 16, 17 into a laminated safety glass pane. Instead of that, as shown in FIG. 3, the reflection hologram 6 may be disposed on a surface of the glass pane 19 facing the passenger compartment while glass pane 19 is connected to a second glass pane 18 with the help of a thermoplastic intermediate layer 20 to form a laminated safety glass pane. The hologram 6 is then covered by a transparent, protective foil 21.

For the production of the reflection hologram, one uses the processes known for this purpose such as those whereby gelatin layers photo-sensitized with ammonium dichromate are used as carriers of the hologram. A summarization of the processes known for the production of suitable holograms may be found in the above-cited *Optical Holography* and *Topics in Applied Physics*.

The desired characteristics of the reflection hologram may be achieved by a suitable control of the angles of incidence and wavelength of the beams of radiation used to form the hologram. Thus, for example, the character of a flat reflecting surface may be achieved by interfering two plane parallel beams of coherent radiation in the volume of a suitable medium that is sensitive to such radiation. The diffraction grating so developed in such volume then acts like a selective mirror which in the case of irradiation at a prescribed irradiation angle, reflects almost 100% of the incident light, while the hologram remains highly transparent for light of the same wavelength striking at a different angle.

Whenever a reflection hologram is to be produced for a curved windshield which is to have the characteristic of a flat mirror, then one may proceed in such a way that during formation of the hologram, the substrate carrying the light sensitive layer in which the hologram is formed is curved in such a way that the radius of curvature of the layer containing the hologram agrees with the radius of curvature of the windshield. For this purpose one places a transparent plastic foil coated with photo-sensitive dichromatic gelatin between two glass panes curved to correspond with the curving of the windshield. The glass panes are pressed together and in this deformed state a flat mirror hologram is formed by interfering two plane parallel beams of coherent radiation.

As has already been mentioned, reflection holograms may have in addition to their mirror characteristic a filtering characteristic. They may be made to reflect a certain wavelength, which one may control almost completely by the developing process of the hologram, while remaining largely transparent to other wavelengths. This effect may be utilized to enhance the recognizability of the signals by adapting the color of the signal transmitters to this optimum reflection wavelength.

In FIGS. 4 and 5, two embodiments of the invention are shown, by way of example, in which the holograms do not function as mirrors but rather record virtual images of several symbols which are selectively made visible.

In the case of the windshield shown in FIG. 4, a hologram 24 is again disposed between the two thermoplastic adhesive layers 14, 15 of a laminated glass pane which connects the two silicate glass panes 16, 17 with one another. In hologram 24 is recorded the information needed to reconstruct the virtual images of various symbols such as the pictograms customarily used in motor vehicles for showing various operational conditions and warnings indicating danger. The symbols are stored in such a way as known in the art that different symbols are reconstructed when the hologram is illuminated at different angles. Thus, a particular symbol appears to the observer only when it is illuminated at the correct angle of illumination. For example, as a result of switching on a light-emitting diode 25 located at a first illumination angle, a first symbol is made visible in the hologram to which the reflection angle $\gamma_2$ corresponds. When a light-emitting diode 26, located at a second illumination angle is turned on, another symbol to which the reflection angle $\gamma_2$ corresponds, lights up in the hologram 24; and, as a result of switching on light-emitting diode 27 yet another symbol will light up associated with the reflection angle $\gamma_3$. As a result of changing the illuminating angle therefore, the desired symbol may be made to light up. The color of the light source in this case is selected to coincide with the optimum reflection wavelength of the hologram. As a result, one may narrow down the selection angle and still maintain suppression of the other symbols. For the selection of the symbols one may either move the source of illumination through the range of illumination angles; or else, as shown in FIG. 4, one may dispose a series of fixed light-emitting diodes at various angles and may switch them on according to choice.

In the embodiment shown in FIG. 5, a hologram 28 is a multilayered hologram containing the virtual images of various symbols which are made to light up according to selection. This multilayered hologram comprises multiple holograms disposed one on top of the other in several layers, each responsive to a different wavelength of light, while the illumination angle is identical for all of them. Therefore, the reconstruction of an image from each of the holograms takes place as a result of incident light from diode 29 at a constant illumination angle. In this case, the selection of the desired symbols takes place through selection of the corresponding wavelength of the incident light which may be achieved, for example, by shifting a color filter 30, disposed in front of light-emitting diode 29, in the direction of the double arrow F. The color filter 30 shows three different filter areas 30', 30" and 30''', one beside the other, whereby the color of these filter areas corresponds to the wavelength of the pertinent hologram.

In the embodiments shown, the hologram in front of the eye of the driver is disposed in the central area of the windshield. However, since in each case a certain decrease of transparency takes place in the area of the hologram, it may be advantageous to shift the hologram, and thus the field of display, into the lower area of the windshield which is not used directly for the observation of the street and traffic.

What is claimed is:

1. A windshield for motor vehicles with a partially-transmissive, partially-reflective hologram functioning as and having reflective characteristics of a mirror and fixedly mounted on a curved layer on or within said windshield according to the shape of said windshield for reflecting light from the interior of the vehicle bearing optical information or signals into the field of view of a driver as a result of which said optical information or signals are recognizable by the driver within the same field of view as is suitable for the observation of traffic, said hologram having a surface of reflection that is different from the surface of said windshield such that a ray of light incident on said hologram is reflected by said hologram at an angle that is different from the angle at which the same ray of light is reflected by said windshield whereby if said light bearing optical information or signals is reflected by the windshield it is not reflected into the field of view of the driver, said reflective hologram selectively reflecting a narrow band of light, the wavelength of which is the same as the wavelength of said optical information or signals to be reflected and said reflective hologram being formed such that, without the interposition of any other image forming device, it reflects said optical information or signals so that said optical information or signals appear to be at a large distance in front of said windshield.

2. A windshield as in claim 1 wherein the hologram is formed by placing a photosensitive layer between two transparent sheets having the shape of the windshield, pressing the transparent sheets together to form a curved photosensitive layer and forming the hologram on the curved photosensitive layer.

3. A windshield as claim 1 characterized in that the hologram is disposed on the surface of the windshield facing the passenger space and is coated with a protective foil.

4. A windshield as in claim 1 characterized in that the hologram is disposed below the driver's main field of view through the windshield.

5. A windshield as in claim 1 characterized in that the hologram is formed in a layer of dichromate gelatin.

6. A windshield as in claim 1 in which the hologram reflects signals from illumination sources within the vehicle to the eye of the viewer.

7. A windshield for motor vehicles with a partially-transmissive, partially-reflective hologram fixedly mounted on a curved layer on or within said windshield according to the shape of said windshield, said hologram storing a plurality of virtual images of signals or symbols which selectively become visible to a driver within the same field of view as is suitable for the observation of traffic when said hologram is illuminated from the interior of the vehicle with a reconstructing beam at different angles, said hologram having a plane of reflection that is different from the surface of said windshield such that said plurality of virtual images are projected into the field of view of the driver at an angle that is different from the angle at which the reconstructing beam is reflected by said windshield, said hologram selectively projecting said plurality of virtual images into the field of view of said driver such that said virtual images appear to be at a large distance in front of said windshield while any portion of the reconstructing beam that is reflected by the windshield is not projected into the field of view of the driver.

* * * * *